G. SANFORD.
Hand Seeder.
No. 9,037.
Patented June 15, 1852.
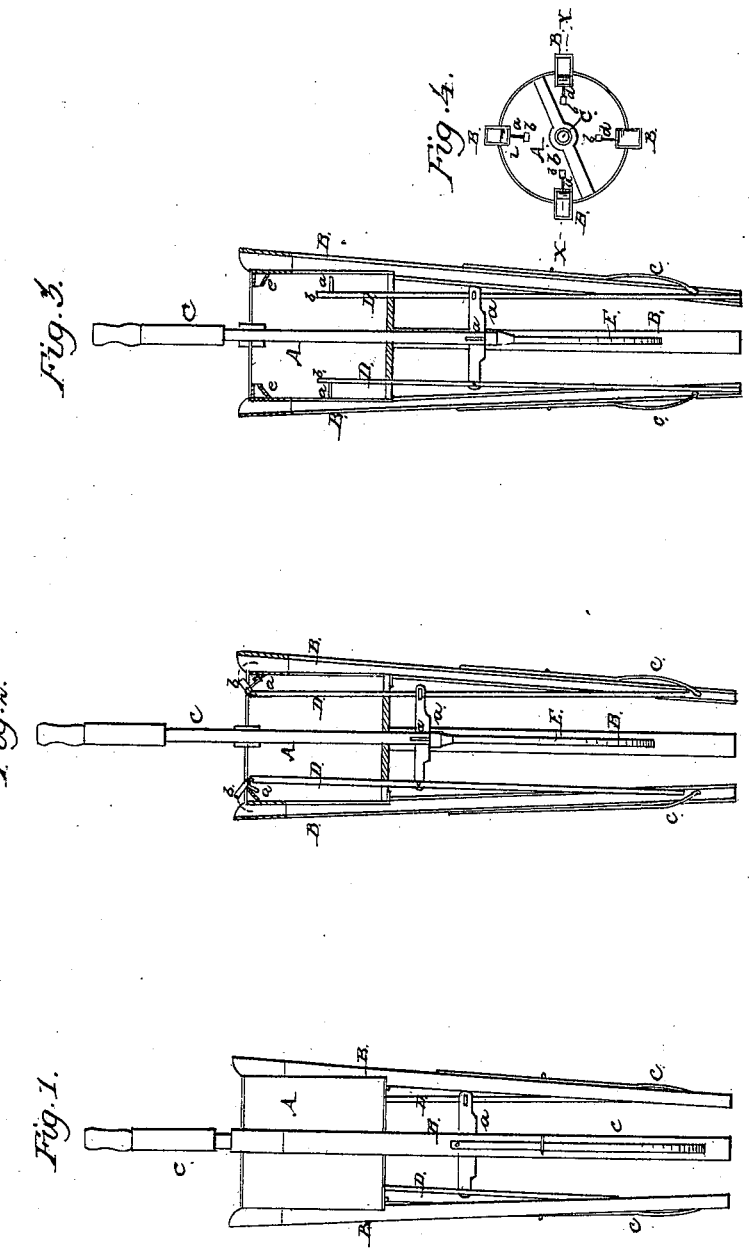

UNITED STATES PATENT OFFICE.

GELSTON SANFORD, OF ELLENVILLE, NEW YORK.

IMPROVEMENT IN HAND SEED-PLANTERS.

Specification forming part of Letters Patent No. 9,037, dated June 15, 1852.

*To all whom it may concern:*

Be it known that I, GELSTON SANFORD, of Ellenville, in the county of Ulster and State of New York, have invented certain new and useful Improvements in Seed-Droppers; and I do hereby declare that the following is a full, clear, and exact description of the construction and operation of the same, reference being had to the annexed drawings, making a part of this specification, in which—

Figure 1 is an external view of the dropper. Fig. 2 is a vertical section of the same, taken at the line X X, Fig. 3, the staff and the two rods, which are seen, not being bisected. The staff in this figure is raised and the seed is being conveyed into the hopper. Fig. 3 is the same as Fig. 2, showing the staff depressed and the seed ejected from the tubes. Fig. 4 is a plan or top view of the same.

Similar letters of reference indicate corresponding parts in each of the several figures.

The nature of my invention consists in having a series of rods passing vertically through a seed-box and connected to a staff, the rods being operated or moved by the staff, which also passes through the seed-box. At the upper part of each rod there is a cup attached by an elastic joint. To the lower part of each cup there is a spur. These spurs, as the staff and rods are raised, catch under projections on the upper ends of tubes to which the seed-box is attached, and the cups are thereby canted or turned over sufficiently to throw the seed into the tubes. The seed passes downward in the tubes, and is retained within them by springs while the staff is raised, but is forced outward as the rods are made to descend.

To enable others skilled in the art to make and use my invention, I will proceed to describe its construction and operation.

A represents the seed-box, of circular form, and attached permanently to four tubes, B, at their upper ends.

C is a staff which passes through the center of the seed-box. To this staff are attached four rods, D. The rods are attached to the ends of two metal strips, *a*, which pass through the staff, forming a cross. There are slots in the ends of the strips *a*, and screws pass through the slots into the rods. By this means some lateral motion or play is given the rods as they are raised or depressed.

To the upper ends of the rods D are attached cups *b*. These cups are attached to the rods by elastic joints made in any proper way. Pieces of india-rubber inserted in the lower parts of the cups and upper parts of the rods would answer. (See Figs. 2 and 3.) The rods, it will be seen, pass through the bottom of the seed-box. The lower ends of the rods fit or pass into the tubes at their lower parts. *c* are springs, one to each tube. The lower ends of these springs pass through slots into the tubes, and bear against the inner sides of the tubes when the rods are raised, and thus close the tubes and prevent the seed from passing out of them. The springs, at their upper ends, are attached to the outer sides of the tubes. (See Fig. 1.)

*d* are small spurs placed at the lower parts of the cups *b*, one to each cup. *e* are projections, one from the upper part of each tube, which incline toward the staff or center of the seed-box.

Operation: Suppose the staff and rods to be depressed, as represented in Fig. 3, and the seed-box A to contain a requisite quantity of seed. By drawing upward the staff C the rods D will also ascend, and the cups *b* on the upper ends of the rods will carry up a certain quantity of seed, each one grain or more, according to the size of the cups and seed. When the rods are elevated a certain distance the spurs *d* catch under the projections *e*, and the cups are canted or turned over sufficiently to throw the seed which they contain into the tops of the tubes. (See Fig. 2.) The seed descends in the tubes, and is stopped or retained in them by the springs *c*, the lower ends of the springs closing the tubes. The red dots represent seed. Now, when the staff C is depressed or forced downward the lower ends of the rods, which fit in the tubes B, force the lower ends of the springs *c* outward and eject the seed from the tubes. (See Fig. 3.)

This implement is carried by hand from hill to hill, or to the different spots where seed is to be dropped, the hand grasping the handle at the upper part of the staff. The bottoms of the tubes are placed over the desired spot, the staff depressed, and the seed consequently deposited in the ground. By raising the staff C the rods ascend until the cups are canted or turned over and seed from the seed-box again conveyed into the tubes. The seed-box and tubes then rise, and the implement is placed over the next spot where the seed is to be deposited.

Having thus described the nature and operation of my invention, what I claim as new, and desire to secure by Letters Patent, is—

The method of conveying seed from the seed-box A and depositing it in the furrow or hill, substantially as herein shown and described—viz., by having the rods D attached in any proper manner to a staff, C, said staff and rods passing vertically through the bottom of the seed-box, the upper part of the rods having cups $b$ attached to them by elastic joints, the cups having spurs $d$ projecting from them, which cant or turn over the cups when the staff and rods are raised, and throw the seed into the tops of the tubes, when they catch under the projections $e$, the lower ends of the rods forcing out the seed from the tubes when the staff is depressed, and the springs $c$ retaining it when the staff is raised.

GELSTON SANFORD.

Witnesses:
   THOS. HOPKINS,
   JAMES CLARKE.